United States Patent
Arner et al.

(10) Patent No.: US 7,650,390 B2
(45) Date of Patent: Jan. 19, 2010

(54) SYSTEM AND METHOD FOR PLAYING RICH INTERNET APPLICATIONS IN REMOTE COMPUTING DEVICES

(75) Inventors: Michael Arner, Brighton, MA (US); John Rodley, Scituate, MA (US); David Lindsay, Marshfield, MA (US); Will Graylin, Saugus, MA (US)

(73) Assignee: Roam Data Inc, Boston, MA (US)

( * ) Notice: Subject to any disclaimer, the term of this patent is extended or adjusted under 35 U.S.C. 154(b) by 300 days.

(21) Appl. No.: 11/755,079

(22) Filed: May 30, 2007

(65) Prior Publication Data

US 2007/0282858 A1      Dec. 6, 2007

Related U.S. Application Data

(60) Provisional application No. 60/809,924, filed on Jun. 1, 2006.

(51) Int. Cl.
  *G06F 15/16*    (2006.01)
(52) U.S. Cl. .................. 709/217; 709/203; 709/227
(58) Field of Classification Search .......... 709/203, 709/217, 227
  See application file for complete search history.

(56) References Cited

U.S. PATENT DOCUMENTS

| | | | |
|---|---|---|---|
| 6,826,398 | B1 | 11/2004 | Lagerstrom et al. |
| 7,000,180 | B2 | 2/2006 | Bathhaser |
| 2005/0038796 | A1 | 2/2005 | Carlson et al. |
| 2005/0198612 | A1 | 9/2005 | Gonzalez |
| 2006/0015581 | A1* | 1/2006 | Breiter et al. ............ 709/219 |
| 2006/0112188 | A1 | 5/2006 | Albanese et al. |
| 2007/0038567 | A1* | 2/2007 | Allaire et al. ............ 705/50 |
| 2007/0106468 | A1 | 5/2007 | Eichenbaum et al. |
| 2007/0202941 | A1* | 8/2007 | Miltenberger et al. ..... 463/25 |
| 2007/0282858 | A1 | 12/2007 | Arner et al. |
| 2008/0040371 | A1 | 2/2008 | Bayyapu et al. |

OTHER PUBLICATIONS

O'Rourke, C. A Look at Rich Internet Applications. Oracle Magazine (online). Jul. 19, 2004. Retrieved from the Internet: <URL: http://wolfpaulus.com/theodore/doc/richinetapp.pdf>.

(Continued)

*Primary Examiner*—Phuoc Nguyen
(74) *Attorney, Agent, or Firm*—AKC Patents LLC; Aliki K. Collins

(57) ABSTRACT

A system and a method of playing rich internet applications on remote computing devices by using a certifying player to invoke server-side web services through a single, secure, certifying intermediary server. The application player resides in the remote computing device and is configured to be executed by the remote computing device. The intermediary server is configured to communicate with the remote computing device via a network connection and to receive message requests from the application player and to send message responses to the application player. The intermediary server provides access of the RIA to the remote computing device by accessing an application server, where the RIA resides, via a single, secure and access-controlled network connection. The application player requests functionality of the RIA from the intermediary server via message requests and interprets the message responses received from the intermediary server. The message requests and responses may be Extensible Mark-up Language (XML) messages.

51 Claims, 16 Drawing Sheets

OTHER PUBLICATIONS

Noda, T. et al. Rich Internet Applications—Technical Comparison and Case Studies of AJAX, Flash, and Java based RIA. UW E-Business Consortium (online). Nov. 16, 2005. Retrieved from the Internet: <URL: https://www.uwebc.org/opinionpapers/archives/docs/RIA.pdf>.

Java ME Technology. Retrieved from the Internet <URL: http://java.sun.com/javame/technology/index.jsp.

Canoo announces Rich Internet Applications (RIA) for Mobile Devices and Thin-Client Terminals. Retrieved from the Internet. <URL: http://www.canoo.com/news/ulcmobile.html.

* cited by examiner

SYSTEM AND METHOD FOR PLAYING RICH INTERNET APPLICATIONS IN REMOTE COMPUTING DEVICES

CROSS REFERENCE TO RELATED CO-PENDING APPLICATIONS

This application claims the benefit of U.S. provisional application Ser. No. 60/809,924 filed on Jun. 1, 2006 and entitled SYSTEM AND METHOD FOR RICH INTERNET APPLICATIONS FOR REMOTE COMPUTING DEVICES which is commonly assigned and the contents of which are expressly incorporated herein by reference.

FIELD OF THE INVENTION

The present invention relates to a system and a method for playing Rich-Internet-Applications (RIAs), and in particular to RIAs designed to run on remote computing devices.

BACKGROUND OF THE INVENTION

Desktop applications provide rich user interface experience, are not complex or difficult to develop and use local hardware and software resources which allow them to be responsive and to interact with other connected devices. One example of a desktop application is Microsoft Outlook™ an application designed for checking e-mail, managing a calendar and contact information. On the other hand, web-based applications are applications accessed with a web browser over a network. One example of a web-based application is Hotmail™, a website for checking e-mail. Web-based applications are easy to deploy and manage and can be deployed even on mobile devices that are sporadically connected to a network. Smart-client applications are applications that combine the best of the desktop applications and web-based applications. They use local hardware and software resources and provide a rich user interface experience. They are connected applications that exchange data on the Internet or any other enterprise network. They are also capable of running offline and can be easily deployed and updated. Smart-client applications are poised to replace traditional web-based applications on desktop computing devices and eventually on remote mobile devices because computer users are accustomed to a rich media experience and expect to have a similarly rich experience when they use web-based applications, even on mobile devices. When we use the term desktop applications we specifically include both applications developed for the desktop and applications developed for remote devices using traditional desktop methodologies.

Rich Internet Applications (RIA) are smart-client web-applications that have the functionality of traditional desktop applications, but transfer the processing necessary for the user interface to the web client while maintaining the state of the program and keeping the bulk of the data back on the application server.

Mobile remote devices include mobile phones, personal digital assistants (PDAs), point of sale (POS) devices, tablets, pagers and laptop computers, among others. Mobile remote devices are usually underpowered, only sporadically connected to a server and usually via a limited bandwidth connection. Mobile devices have extremely limited storage and processing capacity and are often out of their areas of coverage, or not connected to the network for other reasons. Furthermore, mobile devices are susceptible to loss and/or theft, have varying capabilities, and usually run on varying platforms and operating systems. Applications for remote mobile devices (i.e., mobile remote applications) are difficult to develop and deploy due to the varying platforms and operating systems. Mobile applications are also difficult to certify and control once deployed. They are inherently insecure due to the remote device's mobility and susceptibility to theft/loss and due to the fact that they are usually developed based on assumptions and/or methodologies valid for the desktop environment.

Historically, mobile application development has been performed by highly trained programmers. However, more and more lay people are attempting to develop applications, but the currently available development languages and environments make the task difficult for non-highly trained programmers. The intermittent connectivity of mobile devices makes downloading and deploying of applications an error-prone process, which becomes more error-prone the richer and larger the application becomes. In addition, mobile devices often require the use of device-specific mechanisms to install applications above and beyond the effort needed to get the actual bytecodes onto the device. High-value applications, such as mobile payment applications, often have to be certified by a neutral third party to adhere to best security practices. The certification process for wireless applications is extremely lengthy, involving certification of all elements of the application, such as the server software, the client software, the communications protocol, among others. In some cases, certification can last several years, so that the majority of the development cycle is spent waiting. Once an application is deployed in a mobile device, it is difficult to control it because one can not assume that the device is in a single physical location and/or under the control of the 'the person who usually sits at that location'. Applications deployed on mobile devices are inherently insecure due to the mobility of the device and the ease of becoming lost. Data stored on a lost mobile device can be intercepted by people for whom they were not intended and the device itself is easily 'intercepted'. Enterprise desktop applications are designed to run on a physical desktop contained within the physical enterprise as a logical node on the enterprise network. Their physical security is contained within the physical security of the enterprise and their network activities are bounded by whatever restrictions the enterprise network administrator chooses to impose on them. On the other hand, mobile applications run outside the physical boundaries of the enterprise and are logical network nodes on the public network and thus typically not subject to any restrictions as to what other network nodes they might contact. Therefore, mobile devices are insecure in practice when running applications developed for the desktop or applications developed using traditional desktop methodologies.

Ideally, rich internet applications (RIAs) designed to run on mobile devices must address all of these limitations. Furthermore, it is desirable for applications to be platform independent, allowing an enterprise to deploy it on its mobile devices as well as its desktop machines and other devices. However, existing client pieces for delivering RIAs are too heavy for cellphones, and existing smart client solutions require programming knowledge, which excludes many potential developers. Prior art smart-client solutions include the following:

J2ME, the Java 2 Micro Edition is a pared-down version of the Java Virtual Machine (JVM) designed to run on cell-phones, personal digital assistants (PDAs), and other mobile devices. However, J2ME solutions are not secure when networked as J2ME does not address the issue of how to restrict devices from promiscuous/dangerous network connectivity. J2ME is an enabling technology and platform. JVM type solutions require custom client-side programming, network programming, and server-side integration.

NET Compact Framework s a version of the .NET Framework that is designed to run on mobile devices such as PDAs and mobile phones. The .NET Framework is a key Microsoft offering, and is intended to be used by most new applications created for the Windows platform. Similar to the J2ME, it is an enabling technology and platform, but lacks security when networked.

AJAX, Asynchronous JavaScript and XML, is a collection of technologies used to bring RIAs to browsers. AJAX applications are complex to develop and deploy, and impossible to access-control. Furthermore AJAX calls can go anywhere, which makes it not suitable for enterprise.

FLEX is a combination of a simplified XML language translated into flash and integrated with server components FLEX can call any URL, web-service oriented or not, and so is not bound by or compliant with any web-service standards, and thus sacrifices security.

Flash Lite is a pared-down version of the Macromedia Flash Player designed to run on cell-phones, personal digital assistants (PDAs), and other mobile devices. Flash solutions are not inherently secure when networked as Flash does not address the issue of how to restrict devices from promiscuous/dangerous network connectivity. Flash again is an enabling technology, a platform upon which an application player can run.

LAZSLO, a development platform for RIAs that incorporates the Lazslo server. LAZSLO lacks security focus and addresses only a single aspect of the problem, i.e., how to deliver the same application to multiple device types.

Wireless Application Protocol (WAP) browser-type applications. WAP is an open international standard for applications that use wireless communications for providing Internet access to a mobile device. WAP sites are websites written in Wireless Markup Language (WML) and are accessed via a WAP browser. WAP based solutions have limited off-line capabilities, make bandwidth demands proportional to the sophistication of the UT, require custom server-side integration, and suffer from the security vulnerabilities of non-stated, open-endpoint network applications. They also have severe restrictions with respect to which client-side peripherals they can access.

Therefore there is a need for a method of delivering RIAs to a variety of devices, including both desktop and mobile devices that overcomes the above mentioned security, access control, computing power, bandwidth and platform problems.

SUMMARY OF THE INVENTION

The present invention relates to a system and a method of playing rich internet applications on remote computing devices by using a certified player to invoke server-side web services through a single, secure, certified server intermediary.

In general, in one aspect, the invention features a system for playing a Rich Internet Application (RIA) on a remote computing device including an application player and an intermediary server. The application player resides in the remote computing device and is configured to be executed by the remote computing device. The intermediary server is configured to communicate with the remote computing device via a network connection and to receive message requests from the application player and to send message responses to the application player. The intermediary server provides access of the RIA to the remote computing device by accessing an application server, where the RIA resides, via a single, secure and access-controlled network connection. The application player requests functionality of the RIA from the intermediary server via the message requests and interprets the message responses received from the intermediary server.

Implementations of this aspect of the invention may include one or more of the following features. The RIA is configured to be displayed in the application player. The RIA may have business logic requiring data from a source outside of the remote computing device and this business logic is configured to be executed in the application server. The RIA comprises an XML document. The RIA comprises a rich user interface (UI) configured to be displayed in the remote computing device and to receive input from a user via the UI. The application player is configured to access a plurality of RIAs via the intermediary server and the access is controlled by an application privilege protocol and secured by an application security protocol. The application player is also configured to access a plurality of web services via the intermediary server and the access is controlled by a web service privilege protocol and secured by a web service security protocol. The security protocols may be secure HTTP (S-HTTP), link encryption, web services security (WS-S), or any method for character-stream encoding. The privilege protocols are managed by the intermediary server and comprise a first table configured to associate Global Unique Identifiers (GUIDs) with the plurality of RIAs and the plurality of web services and a second table configured to associate RIAs and web services authorized to be executed by the application player. The intermediary server comprises the first and second tables. The application player and intermediary server are configured to be certified by a certifying entity. The remote computing device comprises a managed code environment and the application player is executed within the managed code environment. The managed code environment may be a Small Technical Interoperability Platform Virtual Machine (STIP VM), J2ME, .NET, Flash Lite, or may run outside of the virtual machine environment. The remote computing device further includes an offline application cache and the offline application cache includes one or more applications previously downloaded by the application player. The remote computing device further includes an offline data cache and the offline data cache includes one or more stored web service calls saved for each of the applications for execution at a later time. The remote computing device may further include a secure payment module and one or more device drivers. The remote computing device may be a mobile phone, PDA, payment module, portable computer, personal computer, server, robot, or other computing circuits. The message requests from the application player to the intermediary server may comprise Extensible Mark-up Language (XML) messages embedded in Simple Object Access Protocol (SOAP) requests and the message responses from the intermediary server to the application player may comprise XML messages embedded in SOAP responses. The message requests and message responses may comprise ActionScript Message Format (AMF) format or Secure Mobile Application Platform (SMAP) format. The intermediary server includes a load balancing module for managing request from a plurality of remote computing devices. The intermediary server also comprises a message cache. The intermediary server is configured to communicate with an application database that includes a list of the available RIAs. The intermediary server further provides a complete audit trail of interactions and communications between the remote computing device and the web services and RIAs. The intermediary server provides fine-grained access control to individual web service calls to the web services. The remote computing device is configured to combine multiple individual web service calls into a single chain and the intermediary server is configured to decompose the single chain into its constituent individual web service calls and place the individual web service calls.

In general, in another aspect, the invention features a method for playing a Rich Internet Application (RIA) on a remote computing device. The method includes installing an application player in the remote computing device and providing an intermediary server configured to communicate with the remote communication device via a network connection. The application player is configured to be executed by the remote computing device. The intermediary server is configured to receive message requests from the application player and to send message responses to the application player and to provide access of the RIA to the remote computing device by accessing an application server, where the RIA resides, via a single, secure and access-controlled network connection. Next, executing the application player in the remote computing device, then sending a message request from the application player to the intermediary server requesting functionality of the RIA, and then sending a message response from the intermediary server to the application player, where the message response comprises the requested RIA functionality. Finally playing the RIA in the remote computing device by the application player.

Among the advantages of this invention may be one or more of the following. The invention provides a secure access-controlled channel from remote computing devices to enterprise web services. Channeling all communication with the network through a single, secure, certified server intermediary provides web service security, web service access control, device access control and authentication, link security, auditing, and granularity of access control. All data are secure even during transmission across the network. The system provides auditing and tracking of business activities thereby facilitating the device's interactions with the outside world to be recreated. The system provides granularity of access control to the level of individual web service calls. Furthermore, the use of an application player rather than attempting to run RIAs directly on the client device provides platform independence for the RIA, enables functionality even when off-line, and abbreviates the length of the application certification process. Applications are easy to develop through the system Integrated Development Environment (IDE). Much of the challenge of creating an effective RIA is in designing a user interface that provides a satisfying experience. The invention incorporates a drag-and-drop graphical user interface for RIA development, which opens development up to a wide variety of programmers, even those not trained as software engineers.

DETAILED DESCRIPTION OF THE INVENTION

In general, the invention provides a system for securely extending to a remote device RIAs that are actually powered by web services on a server. The system includes a certified player for playing rich internet applications on the remote computing devices. The player invokes server-side web services through a single, secure, certified server intermediary.

Figure 1:
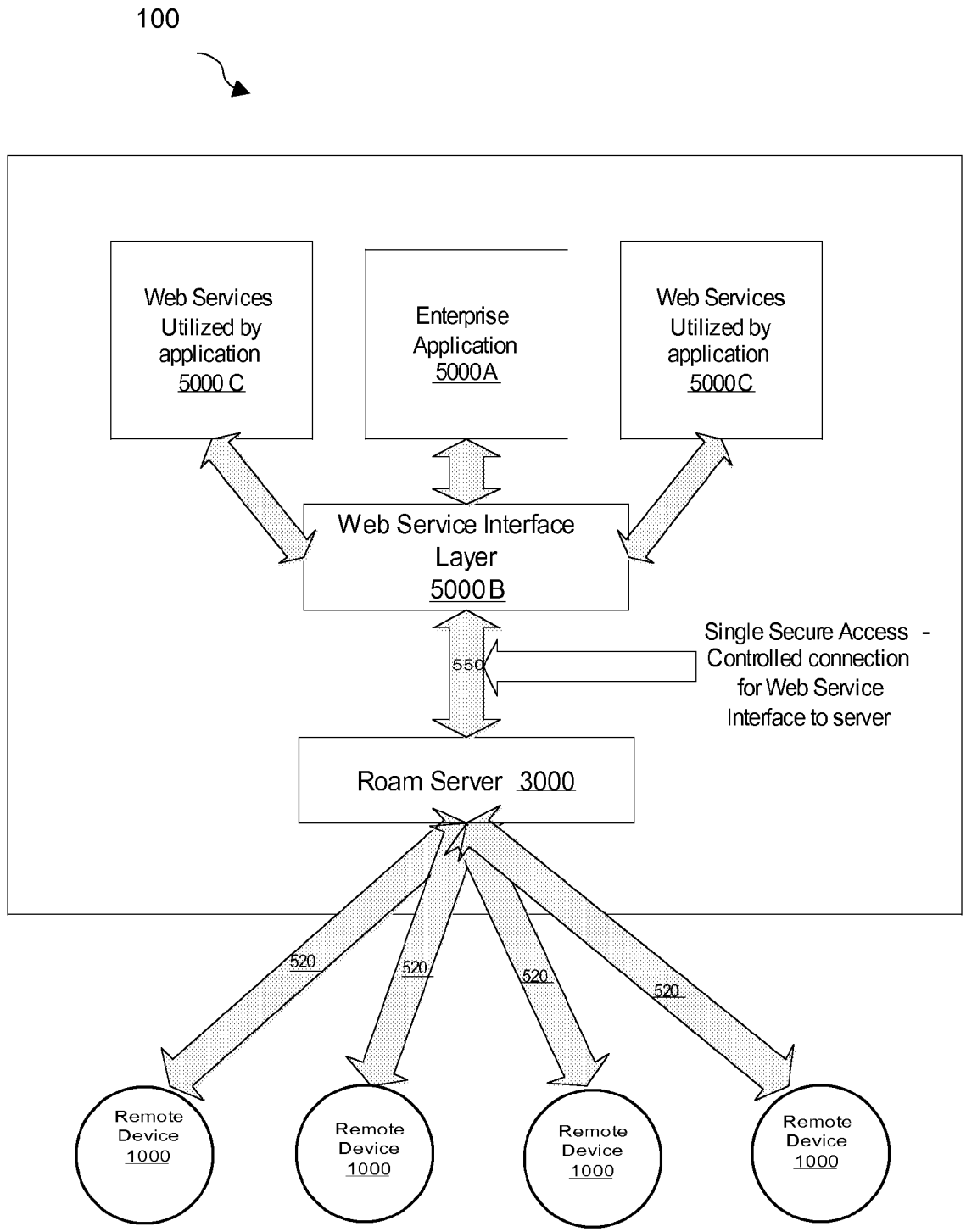
FIG. 1 is an overview diagram of the physical enterprise system.

Referring to FIG. 1, system 100 comprises one or more client devices 1000 interacting with server 3000 via network connections 520. The server 3000 is in contact with an enterprise application 5000A via a web service interface layer 5000B. Server 3000 is also in contact with other web services 5000C utilized by the application via the web service interface layer 5000B. The web service interface layer 5000B is connected to the server 3000 via a single, secure, access controlled connection 550.

Client Device 1000 is usually a handheld remote communication device on which the application user interface is executed. Examples of handheld communication devices include mobile phones, personal digital assistant (PDA), payment modules and portable computers, among others. In other embodiments client device 1000 is a not-handheld device, such a personal computer, server or any other computing circuits.

Server 3000 is a single, secure pipeline through which the enterprise application 5000A and the client device 1000 communicate. Client device 1000 is able to contact only server 3000 and server 3000 controls the communication between the enterprise application 5000A (and its potentially sensitive or proprietary data) and those client devices that wish to use it. This enables authentication of the client device and application, as well as encryption and secure transmission of network requests from the client device 1000.

Figure 2:
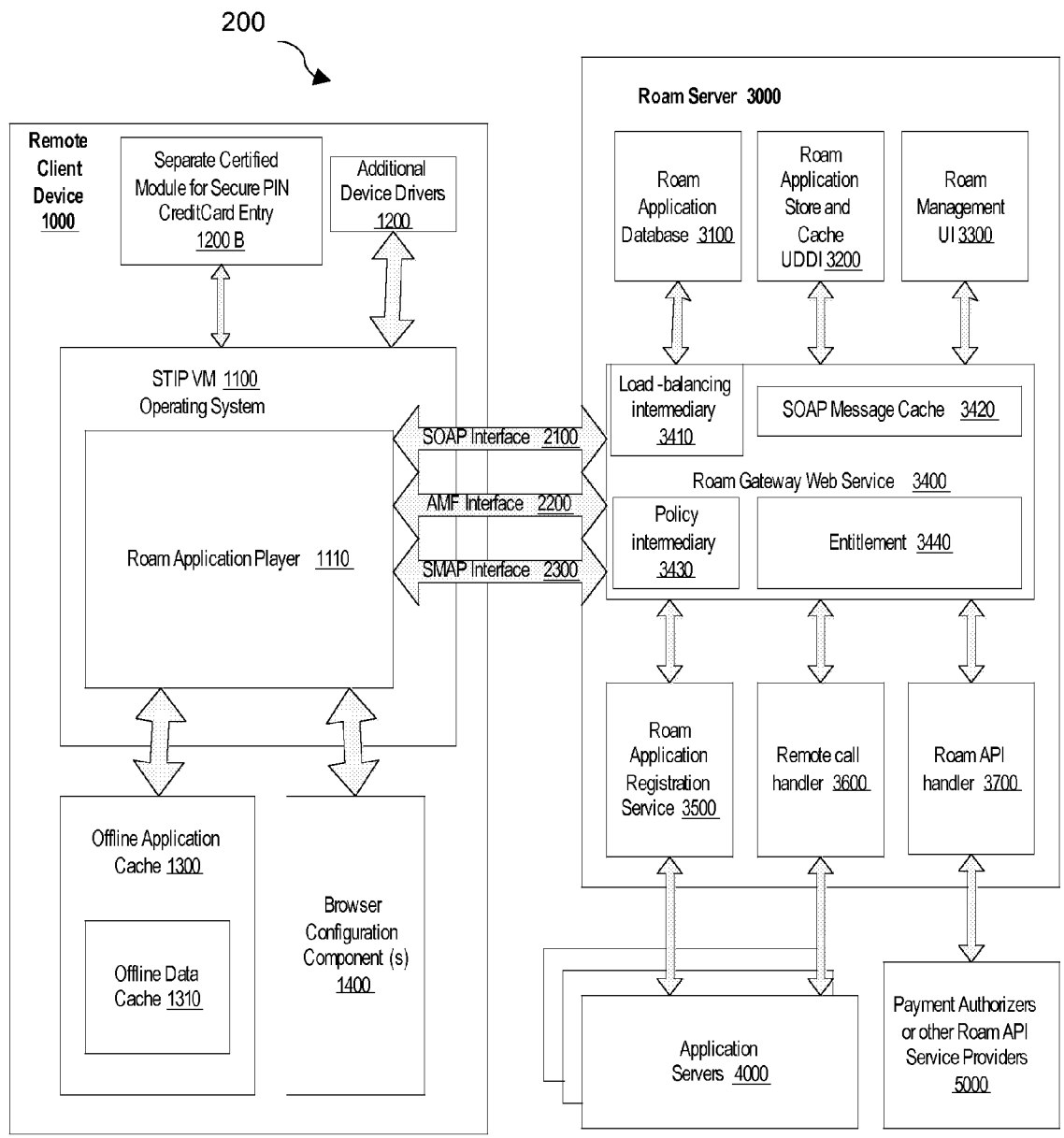
FIG. 2 is a detailed diagram of the system architecture of FIG. 1.
Figure 3:
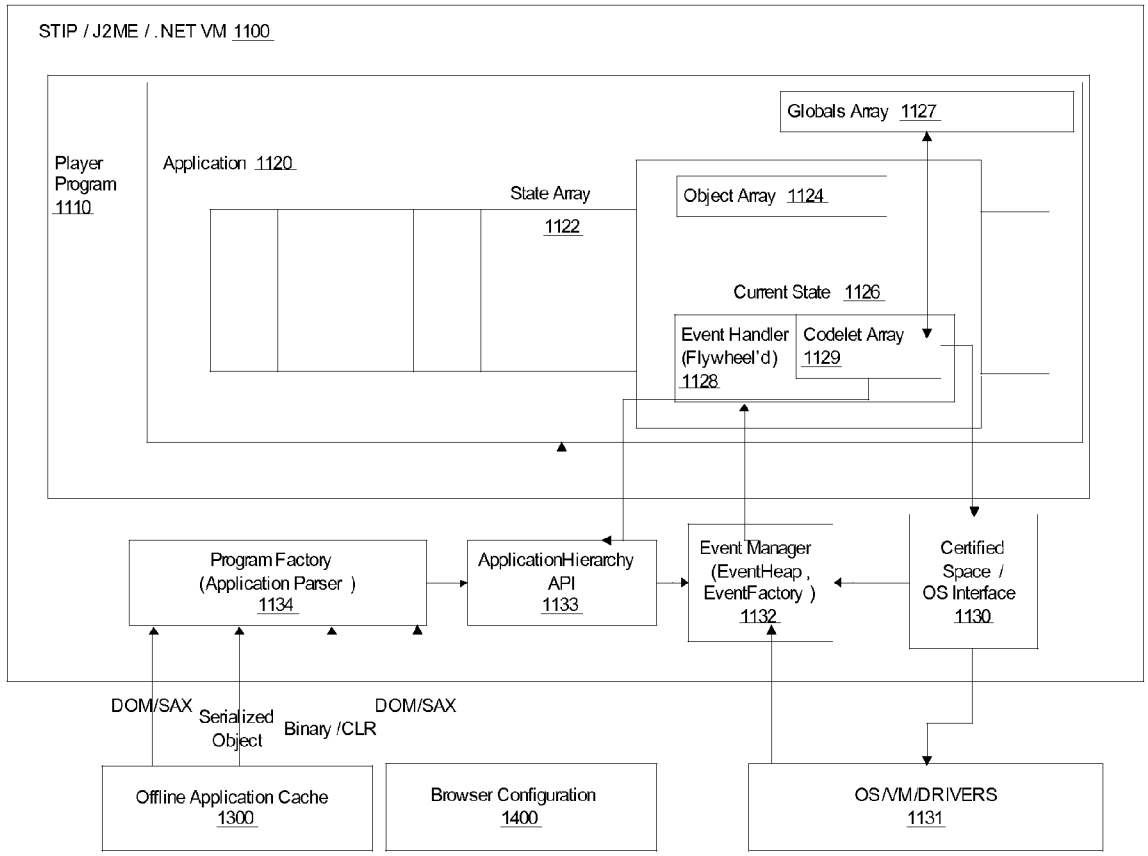
FIG. 3 is a detailed diagram of the application player architecture.

Referring to FIG. 2 and FIG. 3, remote client device 1000 includes an operating system or managed code environment 1100 in which application player 1110 is executed. The managed code environment 1100 is in contact with device drivers 1200 and optionally with a secure payment module 1200B. Device drivers 1200 are any hardware access layer modules that allow the player 1110 to access peripheral devices such as card readers or printers. Application player 1110 is in contact with browser configuration components 1400 and an offline application cache 1300 with its associated offline application data 1310. The application player 1110 requests functionality from the server-side intermediary 3400 through XML messages embedded in Simple Object Access Protocol (SOAP) requests and then interprets the XML messages it receives embedded in SOAP responses from the server-side intermediary 3400. The application player 1110 has access to a local list of applications it is authorized to request and relevant security keys and settings. The server-side intermediary 3400 receives the XML messages embedded in SOAP requests from the player 1110 and sends to the player 1110 XML messages embedded in SOAP responses. As mentioned above, the format of communications between the application player 1110 and the server-side intermediary 3400 is XML and the communication connection is via a SOAP interface 2100. The system also includes one or more remote non-graphical web services, which are located on the network on additional application server 4000 and can potentially be displayed graphically as RIAs on the player 1110.

In one example, the managed code environment 1110 is a Small Technical Interoperability Platform Virtual Machine (STIP VM). Other examples of the managed code environment 1100 include Java 2 Platform Micro Edition (J2ME), .NET and Flash Lite, among others. Operating environment 1100 provides a way for the player 1110 to access operating system resources. The managed code environment 1100 executes the application player 1110, which is in contact with browser configuration components 1400 and an offline application cache 1300 with its associated offline application data 1310. Offline application cache 1300 is a set of applications (XML files) that this player instance has downloaded. Offline data cache 1310 is the set of stored web service calls that each application has saved for later execution on the application server host. These stored web service calls enable the offline functionality. Browser Configuration Components 1400 is a set of device-specific parameters that the player 1110 and its applications use to tailor the users experience of applications. These configuration components are locally stored name-value pairs that can be managed both locally and remotely via the server 3000. Examples of browser configuration parameters include, maximum size of the offline cache, auto-player-update on/off, auto-application-update on/off, and debug logging on/off, among others. The use of an application player rather than attempting to run RIAs directly on the client device provides platform independence for the RIA, enables functionality even when off-line, and abbreviates the length of the application certification process.

Referring again to FIG. 2, server 3000 includes a server-side intermediary or Gateway web service 3400 through which all communications to and from the client device 1000 pass. The server-side intermediary 3400 has access to a database with a table that associates Global Unique Identifiers (GUIDs) with remote web services and a table specifying which web services are authorized for which players. The Gateway web service 3400 comprises one or more server-side machines that act as intermediaries between the client device 1000 and the application servers 4000 which host the web-services that provide RIA functionality to the client 1000. These one or more server-side machines include a load-balancing intermediary 3410, a SOAP message cache 3420, a policy intermediary 3430 and an entitlement module 3440. The load-balancing intermediary 3410 is designed to facilitate the demands of numerous client devices 1000 simultaneously by dispatching requests evenly among the various server-side machines that comprise the server 3000. The SOAP Message Cache 3420 is a queue of SOAP messages to be executed by the server whose results will typically be passed back to a remote device 1000. The policy intermediary 3430 ensures that only authorized users on authorized client devices can access RIA functionality. The entitlement module 3440 controls the access that a request has to the resources it desires. Fine grained web service access control is enabled by this entitlement module.

The Gateway web service 3400 is in communication with an application database 3100, an application store and cache 3200, a management UI 3300, an application registration service 3500, a remote call handler 3600 and an API handler 3700. The application database 3100 includes a set of application XML files representing the currently available applications in the system. The application database 3100 cross-references Globally Unique Identifiers (GUIDS) sent by the client application player 1110 with the XML user interface of the requested RIA. The application store and cache 3200 is an interface into the application database 3100 that conforms to the Universal Description Discovery and Integration (UDDI) discovery standards for machine readable service functionality discovery. Management User Interface (UI) 3300 is a set of web application screens that allow data center administrators to control the use of the system, for example, allowing or disallowing access to a particular web service, or promoting an application from test to production. The Application Registration Service 3500 is the module that allows the developer to publish an application from the Integrated Development Environment (IDE). The remote call handler 3600 executes properly authenticated web service calls and the Application Program Interface (API) handler 3700 is an interface that external services 5000 (like payment processors) implement in order to be accessed from within the system. There is no logical distinction between API implementers and web service providers—it's an implementation mechanism that allows developers to get at, for instance, a DLL deployed on the server without web service wrapping around it.

Server 3000 securely handles interaction between the client 1000 and the application servers 4000 which host the web services that provide calculations and other functionality to the RIA, and between the client 1000 and any supporting applications 5000. All data processing and other calculations and manipulations are executed by web services hosted on application servers 4000. The user's experience of the RIA on the client 1000 comprises only display of an XML user interface and subsequent display of application results, also received in the form of XML.

Server 3000 provides a single, secure, access-controlled and actively managed channel from the application running on the device to the (one or more) web services exposed by the enterprise. Since the player 1110 communicates only with the server 3000, applications running on the client device 1000 cannot connect with unauthorized web applications and are therefore secure. The system is secure along all links via the use of industry standard link encryption and access controlled at all interfaces via the use of industry-standard user authentication. Link encryption refers to communications security protocols that encrypt and decrypt all traffic at each end of a communications line. Examples of industry standard link encryptions include secure HTTP (S-HTTP), web-services security (WS-S) and Way Systems Secure mobile application platform (WS-SMAP), among others. User authentication refers to the process of establishing or confirming the digital identity of a user or device such as the client device 1000 or the servers 4000 and 5000. Examples of industry standard user authentication include WS-S, lightweight directory access protocol (LDAP) and proprietary device authentication, among others.

Web services at the enterprise are not inherently categorized or organized into any hierarchy that differentiates one from the other. Without an access-controlling mechanism, all users have equal access to all Web services. This is undesirable in a situation where server-oriented architecture (SOA, web services) is implemented as an enterprise initiative covering all systems from mission-critical data center application administration to unrestricted public information portals. Existing mechanisms for access-control rely either on internal implementation within each web service, or are limited to the system that is hosting the web service. In the present invention, server intermediary 3000 provides fine-grained access control over web service (WS) access organized by remote-user and remote-device that spans multiple WS hosts and organizations and requires no instrumentation of the individual web services. As was mentioned above, the server 3000 maintains access-control lists that relate users and devices to individual web services and provide for granting and denying access by those users to those services. These lists contain the unique combination of GUIDS and the identity of remote web services available to the client device 1000. Applications developed with the system IDE have, embedded within them, references to external web services. When these references are executed by a user running such an application, the server determines which external web service is being called, and checks a table of rights, internal to the server, that may, or may not include a record granting that user the right to access that external web service. If the right is granted, the call proceeds and the application proceeds along a normal execution path. If the right is not granted, the application generates an error-event which is handled by the application in whatever manner the application programmer deems best. Typically, it will generate an error message in the application, but in many cases, particularly in the mobile arena, the rights management mechanism can be used to induce the user to upgrade their service level—i.e. pay more money to the application provider.

A key feature of application security best-practice is the concept of non-repudiation. Non-repudiation is defined as the ability of a component to prove that a particular action of that component was driven by an interaction with another component rather than by some invisible, internal process of that component. The key enabler of non-repudiation is auditing, the storage of a trail of actions and data that can easily be used to reconstruct the interactions of the components of the system. The server intermediary 3000 provides a complete audit trail of the interaction of enterprise web services with the remote devices 1000, thus ensuring non-repudiation. This audit trail identifies the device, the user, and the details of the underlying remote connection to the device. In one implementation, fine-grained access control and auditing enable the server 3000 to bill users at an equally fine-grained level. This enables tiered service by enterprises implementing the system where users can be billed for individual calls within a session rather than at the more coarse system of billing for time spent within the application.

Figure 4:
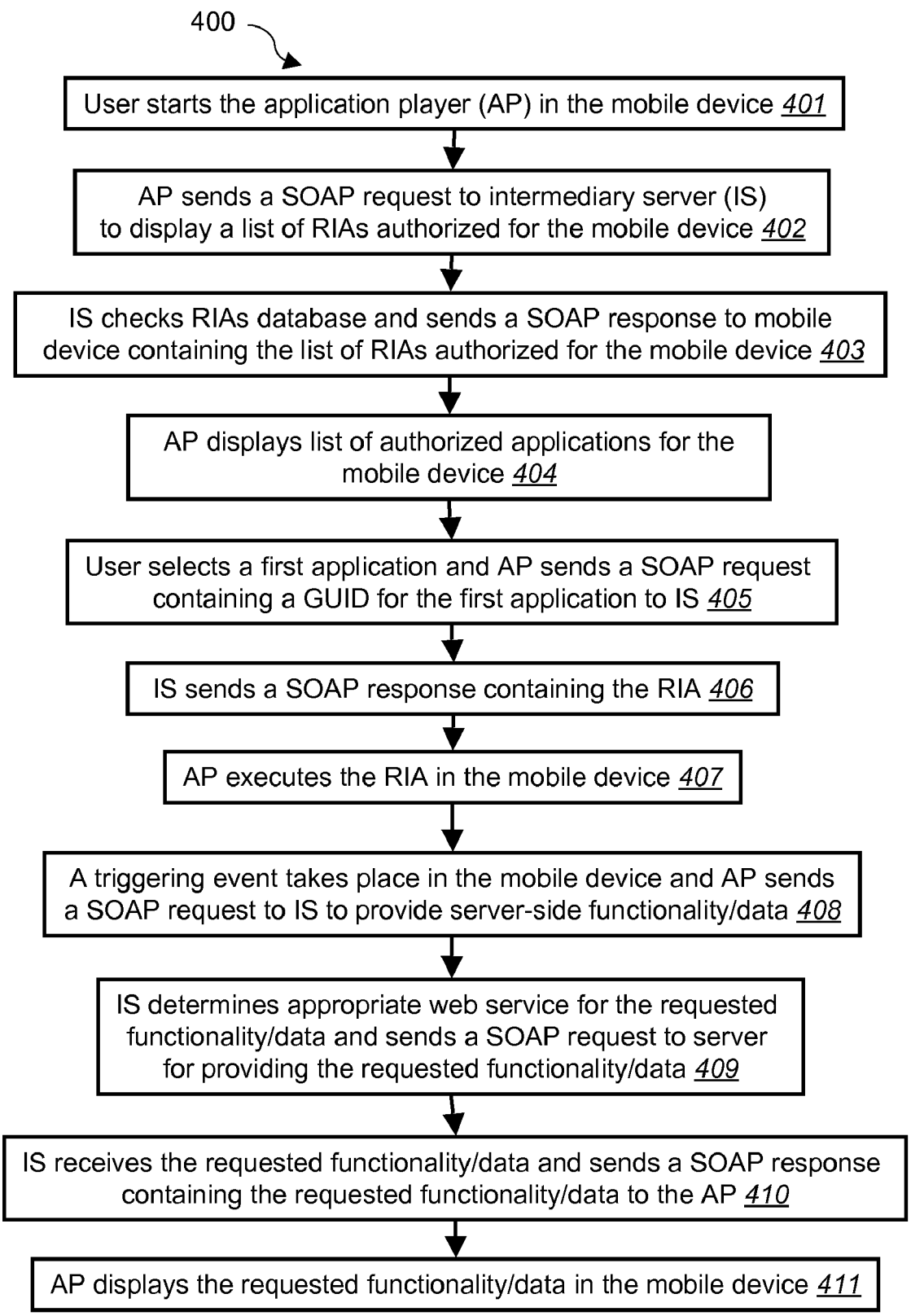
FIG. 4 is a flow diagram of the method of playing a RIA on a remote computing device.

In operation, a user executes the application player 1110 on the client device 1000. The application player 1110 consults first the offline application cache 1300 and presents a list of those applications which this client device 1000 and user are authorized to execute. Referring to FIG. 4, if the remote device 1000 and the server 3000 are both actively connected to the network, the process includes the following steps. First, the user executes the application player 1110 on the remote computing device 1000 (401) and then the player 1110 requests a list of authorized RIAs by sending a SOAP request (XML) that contains a GUID and relevant parameters to the server 3000 (a web service) (402). The server 3000 consults its database and sends a SOAP response that contains the list of applications to be displayed (403). The player displays the list by interpreting the XML embedded in the SOAP response (404). The user makes a selection from the list of available RIAs and the player requests the selected RIA by sending a SOAP request that contains a GUID and relevant parameters to the server (405). The server consults its database and sends a SOAP response that contains the RIA (XML file) (406). The player executes the selected RIA by interpreting the XML in the SOAP response (407). A triggering event takes place (e.g. the user twiddles a widget to activate RIA functionality, or a specified period of time elapses), and the player requests server-side functionality by sending the server web service a SOAP request that contains a GUID and relevant parameters (408). The server consults its database to determine what remote web service to call and sends a SOAP request containing parameters to the specified remote web service or services, potentially sending the output from one web service as a parameter to another (409). The server receives final output from the remote web service(s) and sends a SOAP response that contains the data to the player (410). The player displays the new information by interpreting the XML in the SOAP response (411). If the client device 1000 is not connected to the network the application player 1110 consults the offline application cache 1300 and displays the user interface of a selected application. User interactions with this interface comprise a web service request or requests to be stored in the offline data cache 1310 for transmission when network connectivity is restored.

The system architecture does not presuppose, and is not limited to, any particular physical network or any single network driver stack. All system components are "applications" in the Open Source Initiative (OSI) model, riding on top of whatever network connectivity the underlying operating system provides. In the OSI model, they're consumers of Layer 7 (Application Layer) services. By relying on stateless connections, the system architecture assumes a lowest-common-denominator network functionality that presupposes only the ability to make a request and receive a response. A typical network connection between server 3000 to external web services is HTTPS/TCP/IP over the public Internet. This stack is also typical for the remote devices 1000 that support it. Examples of physical networks supported include, GSM, iDEN, D-AMPS, cdmaOne, PDC, CSD, PHS, GPRS, HSCSD, WiDEN, CDMA2000 1×RTT, EDGE, W-CDMA, UMTS, FOMA, CDMA2000 1×EV, TD-SCDMA, UMA, HSDPA, HSUPA, SONET, Ethernet, Ethernet V2, X.21, and ISDN among others.

If at the time the user selects an application, the client device 1000 is connected to the network the application player 1110 sends a SOAP request 2100 to the gateway web service 3400. This SOAP request 2100 contains a GUID indicating the web service(s) to be executed, any parameters to be passed to the service(s), and authentication information. Other implementations of the invention may replace the SOAP 2100 with Action Script Message Format (AMF) 2200 or SMAP 2300. SOAP interface 2100 is one of the potential mechanisms by which the player and server communicate. Only one of 2100, 2200 or 2300 is used in any player deployment. SOAP is an object oriented Remote Procedure Call (RPC) formatted in XML. AMF 2200 is another communication protocol, currently favored by Macromedia Flash. SMAP 2300 is a communication protocol proprietary to Way Systems that includes transport layer and application layer functionality (i.e., authentication).

An implementation of the system for a "SellingDirect" RIA application is described with reference to FIG. 5-FIG. 16. The "SellingDirect" application is designed for a direct sales "party" along the lines of Avon or Tupperware type sales parties. First, a web-service is created using Microsoft .NET technology. This web-service reads and writes data to a SQL Server database. Next, the "SellingDirect" application is designed using a system-proprietary Integrated Development Environment (IDE) and published to the Data Server. Next, the application is tested and demonstrated on players written for Windows Desktop, Windows Mobile, and GPSTIP (emulator only). The application is designed to run on a PDA or mobile phone, which may or may not have a credit-card swiping mechanism attached. Next, the application is entered into the system via a regular Web Application interface. The application allows a sales consultant to login with a specific consultant ID, see shows entered into the system for that consultant, add orders for a specific customer by item number and quantity, see a summary of the order and pay for it with a credit-card swipe.

Figure 5:
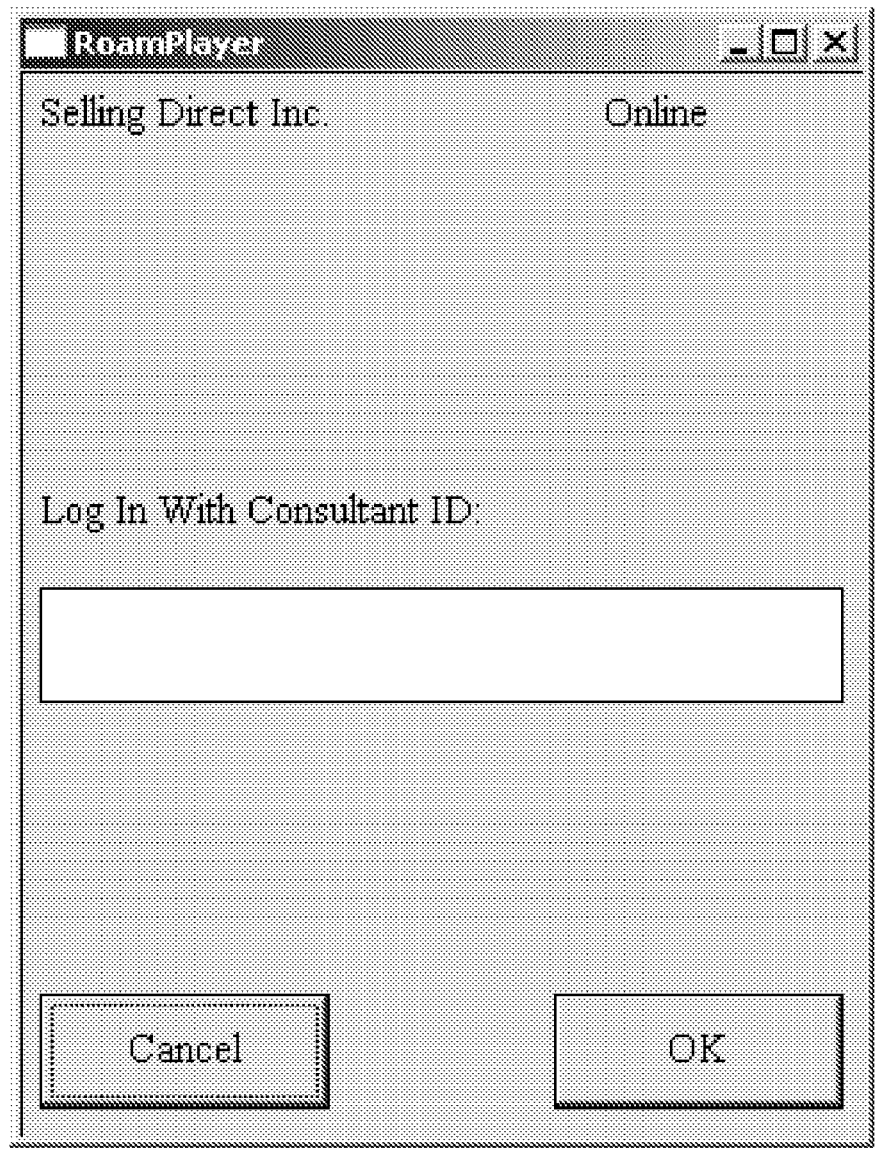
FIG. 5-FIG. 16 depict screen shots of a "Direct Sell" application running on a PDA.
Figure 6:
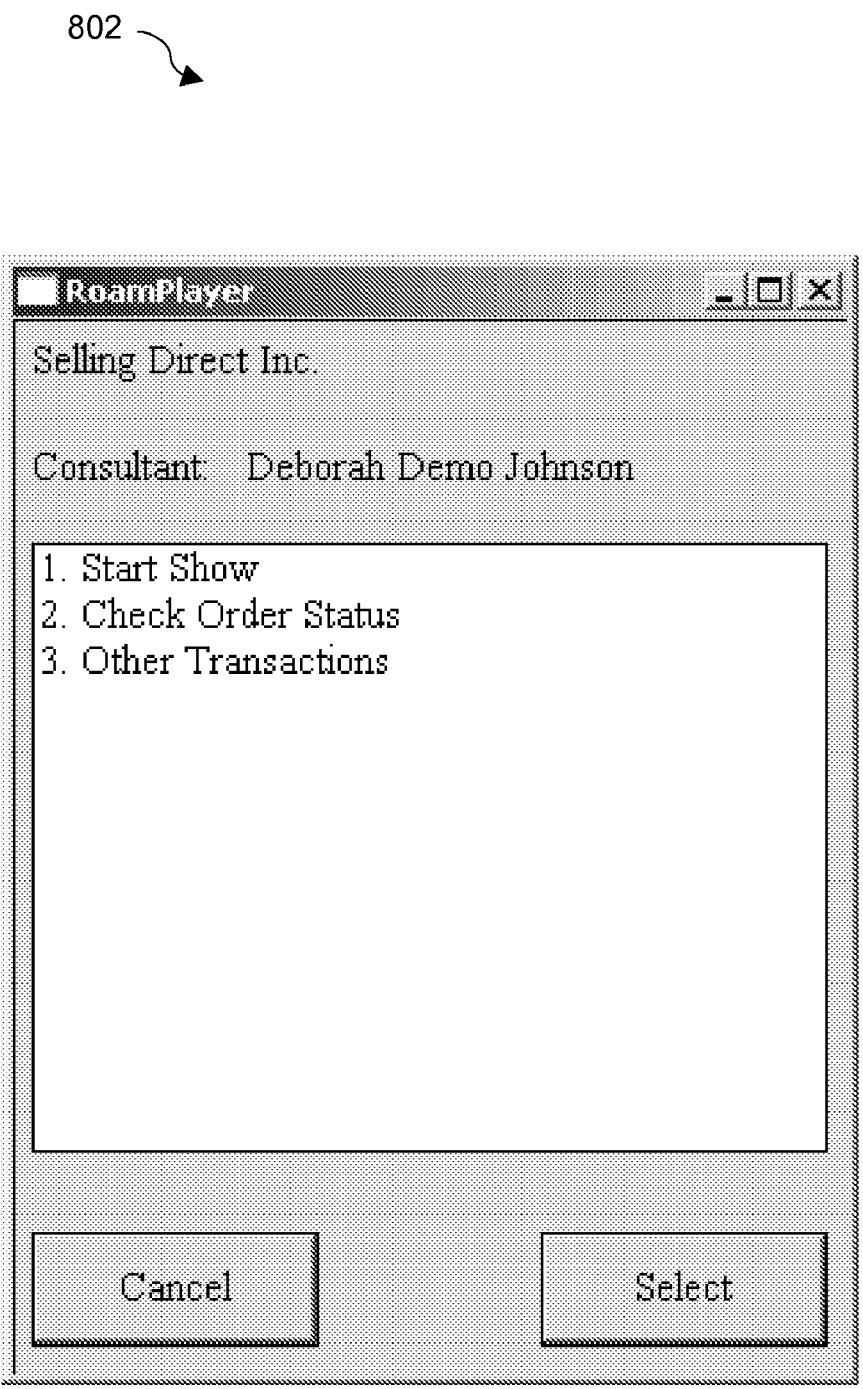
Figure 7:
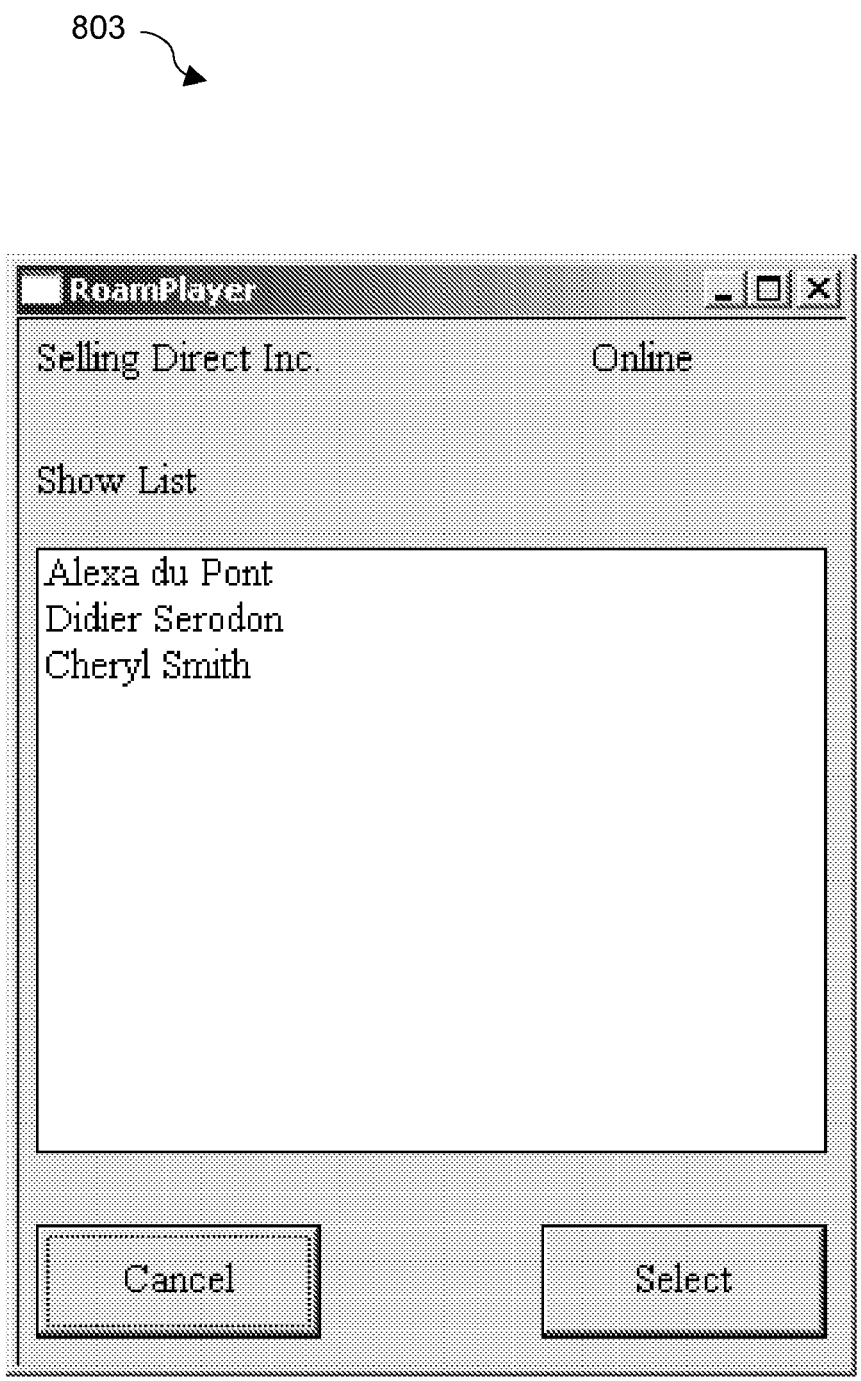
Figure 8:
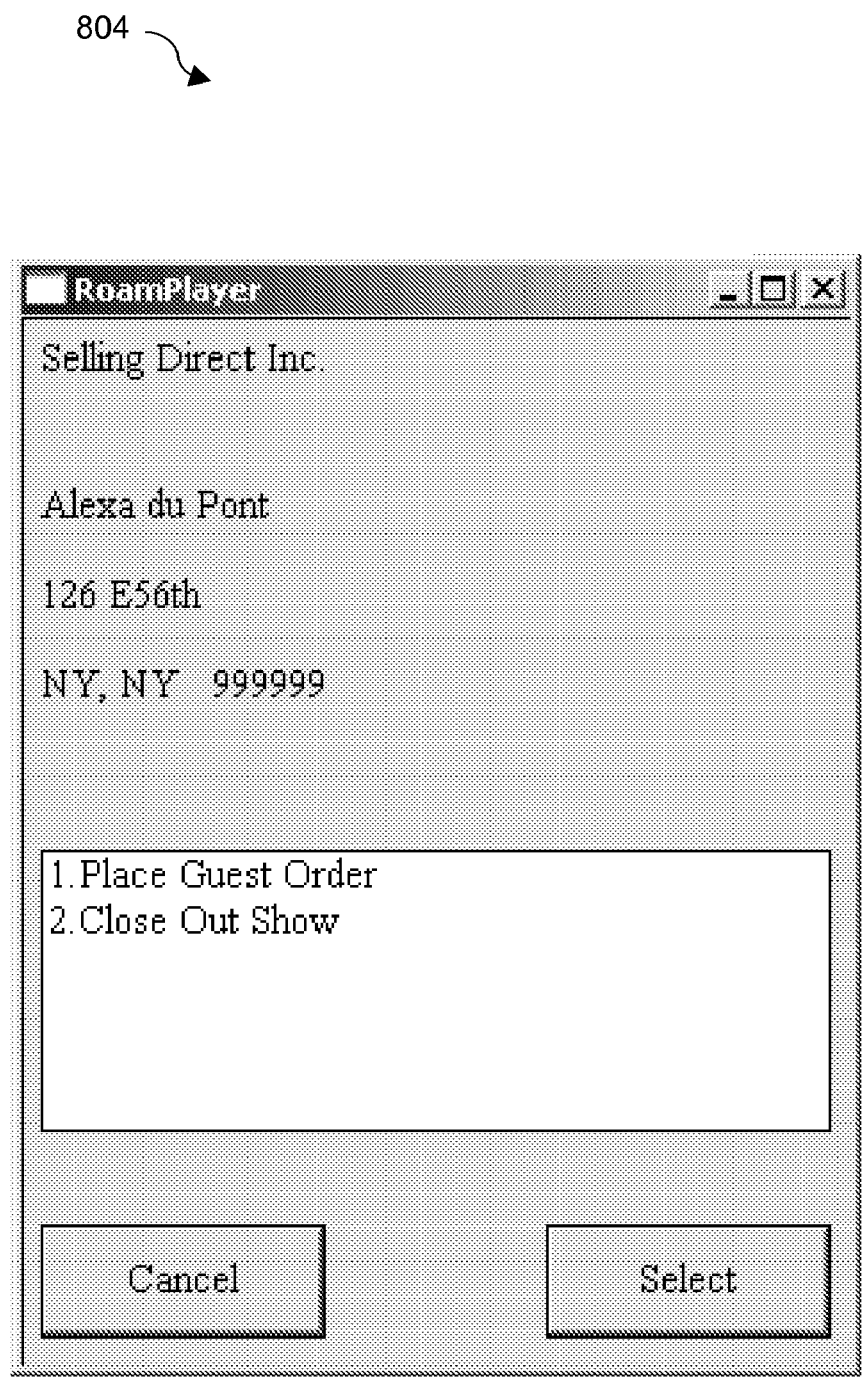
Figure 9:
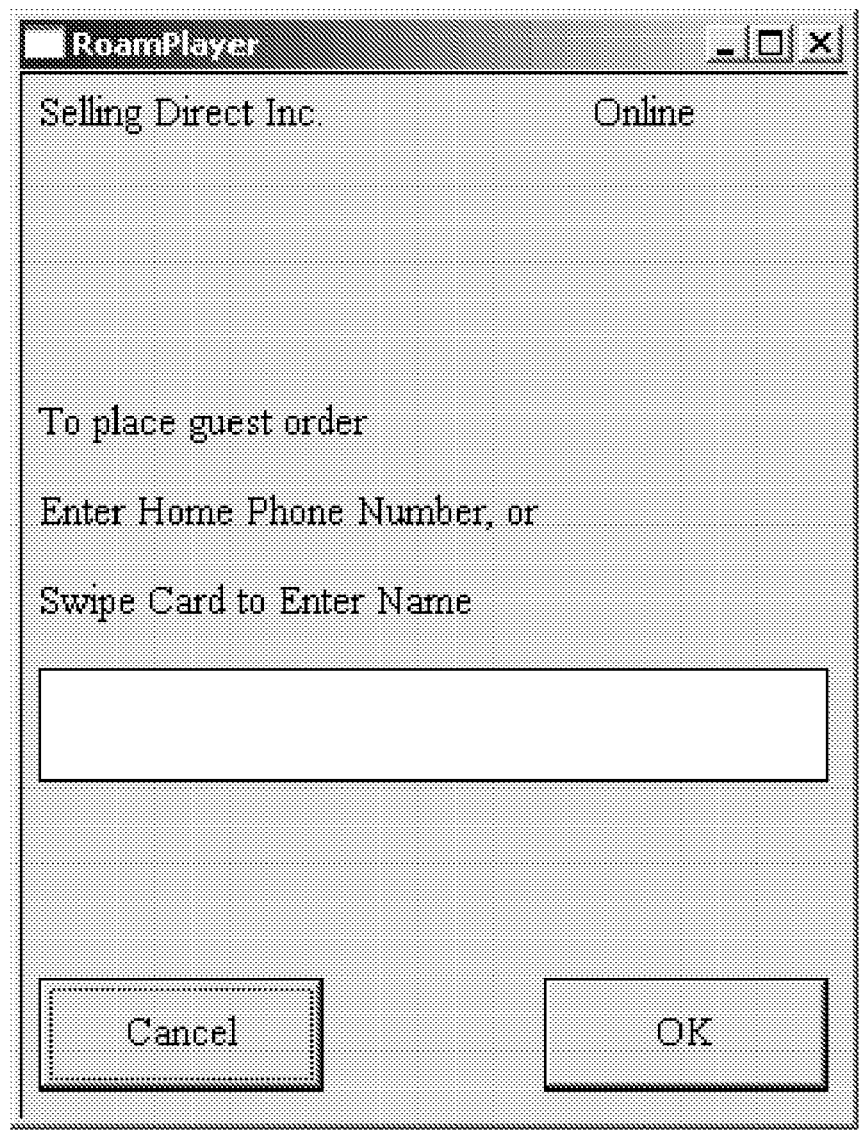
Figure 10:
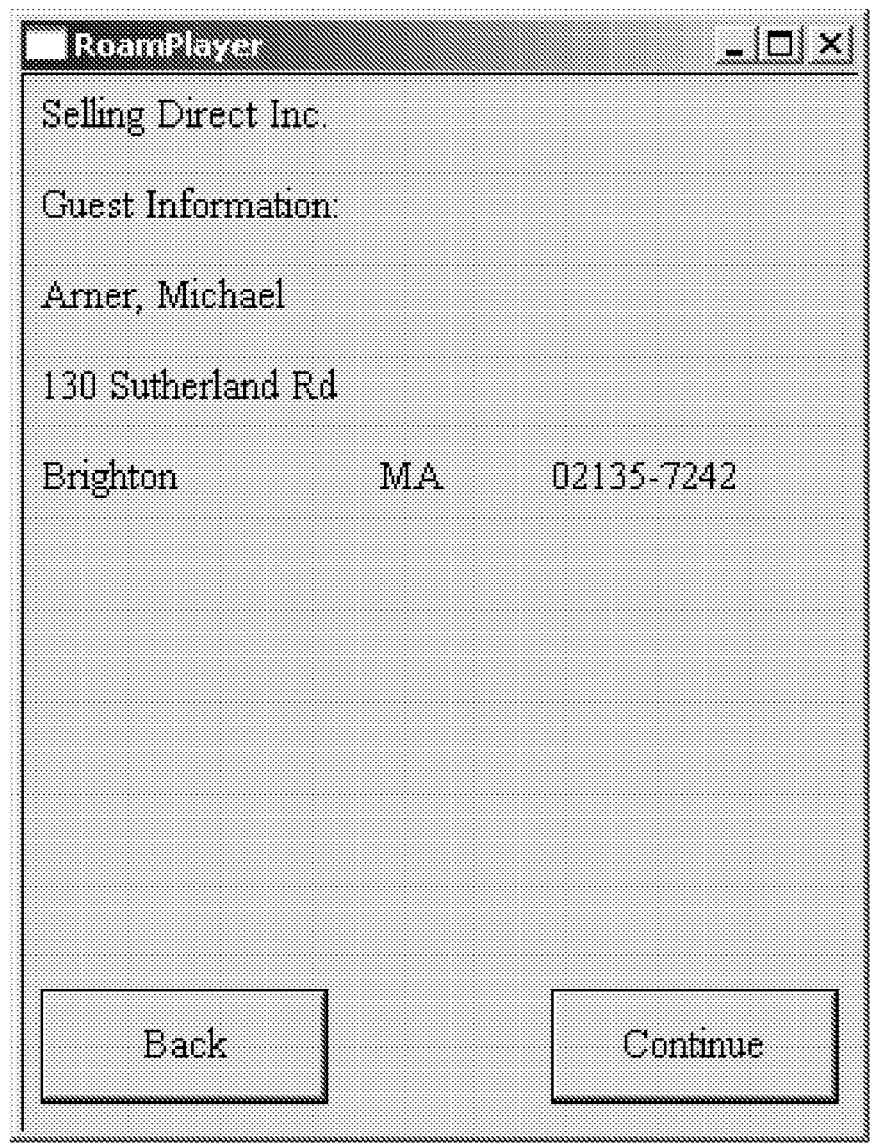
Figure 11:
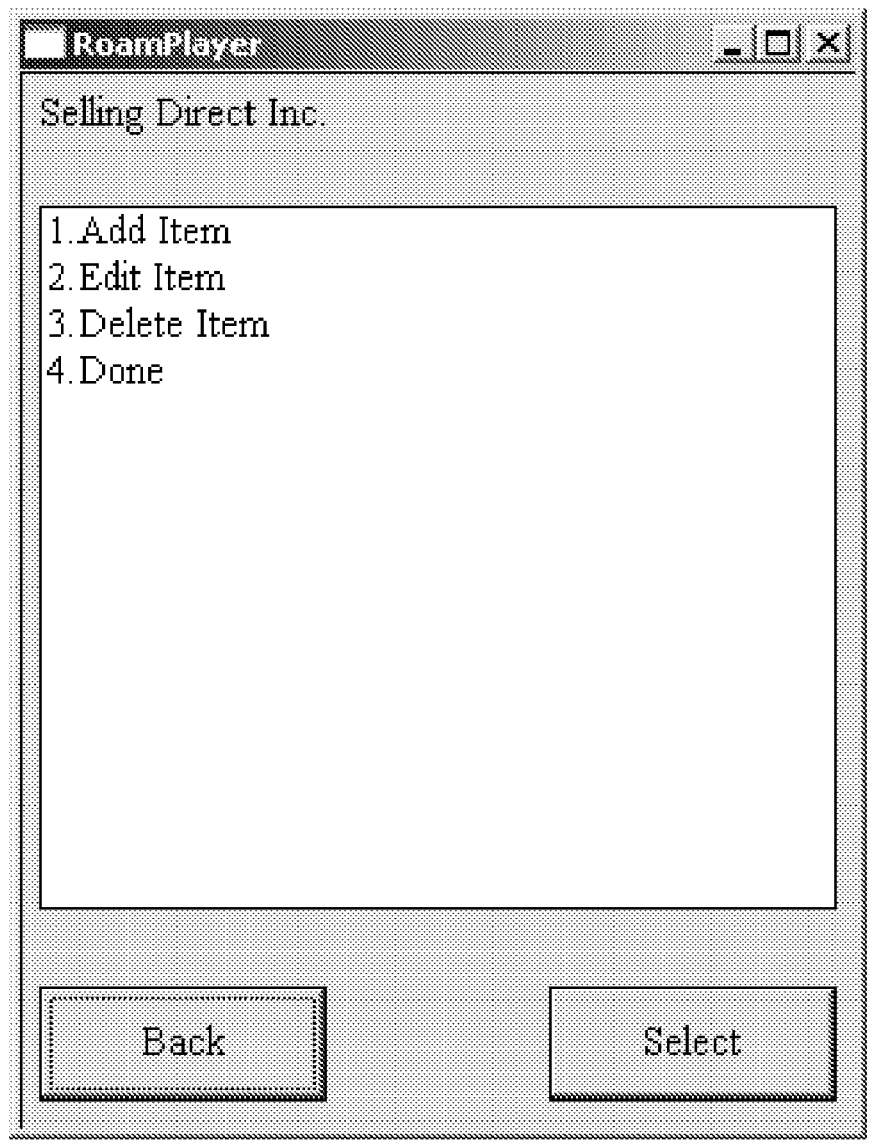
Figure 12:
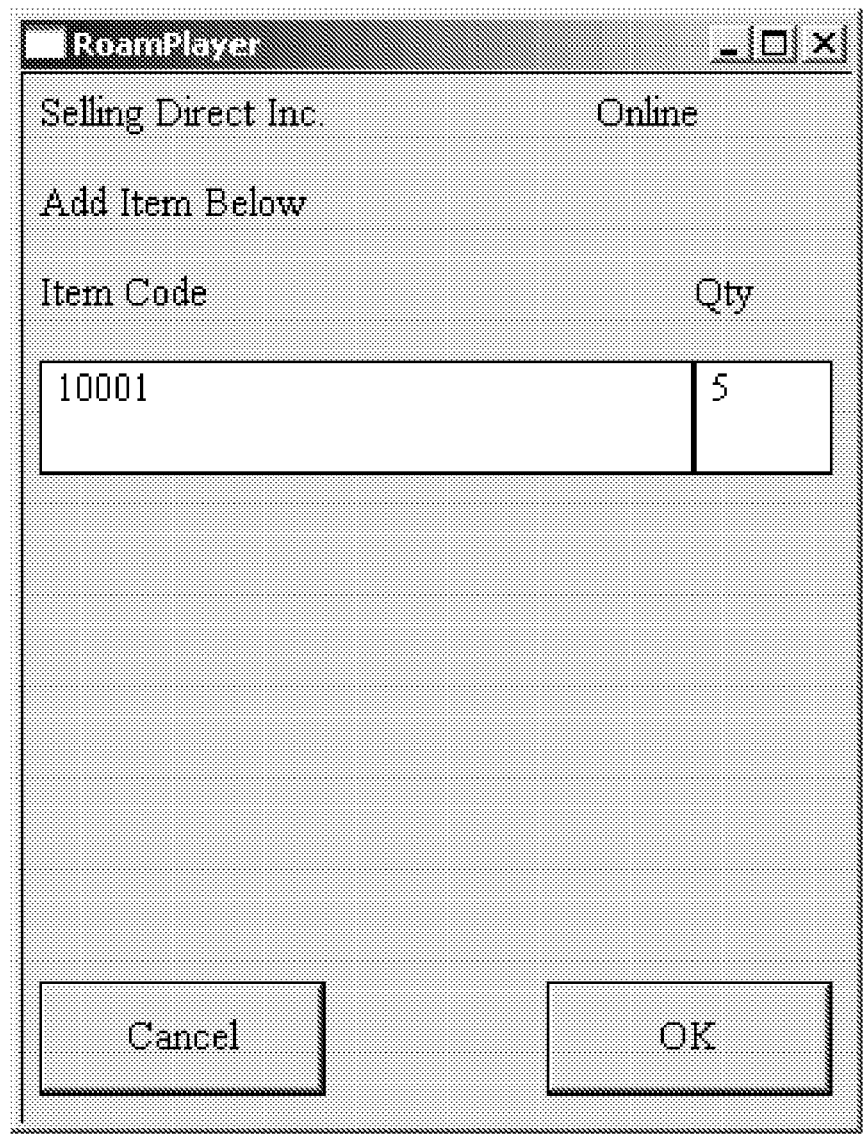
Figure 13:
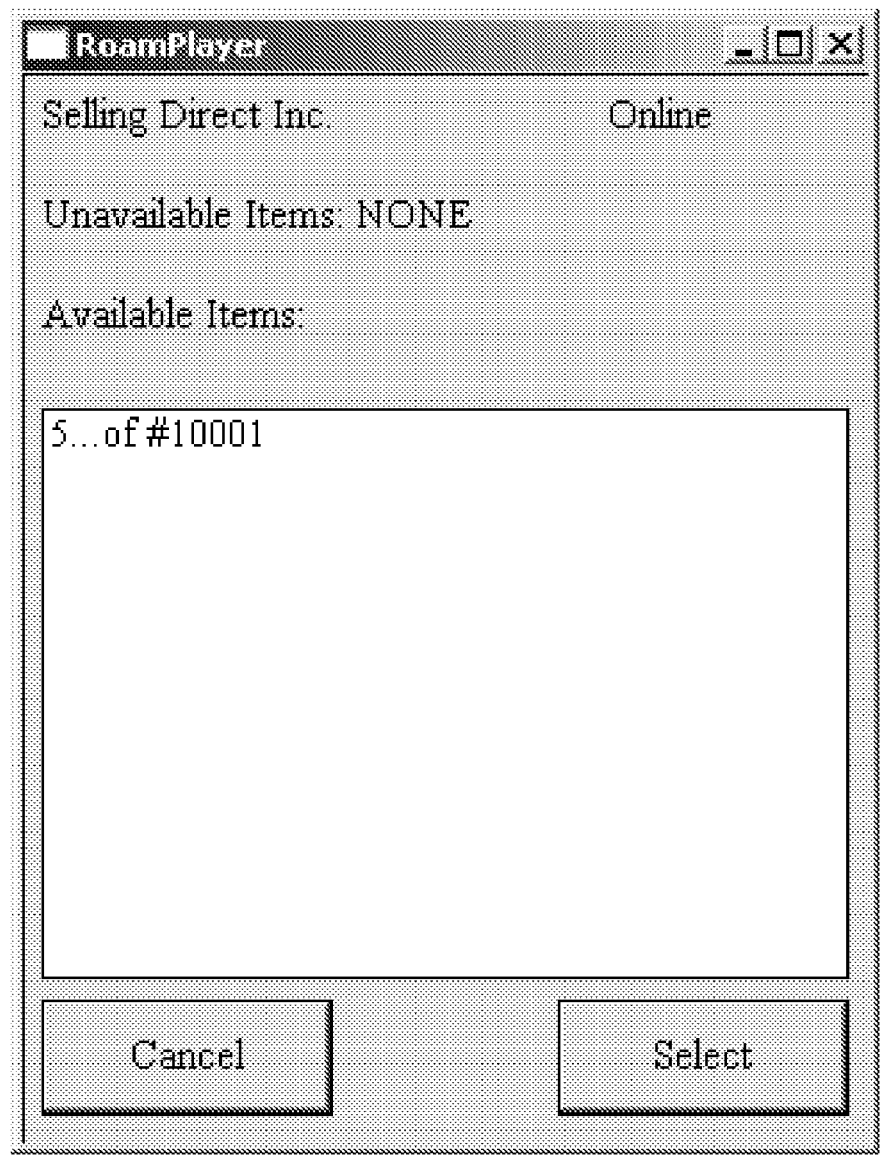
Figure 14:
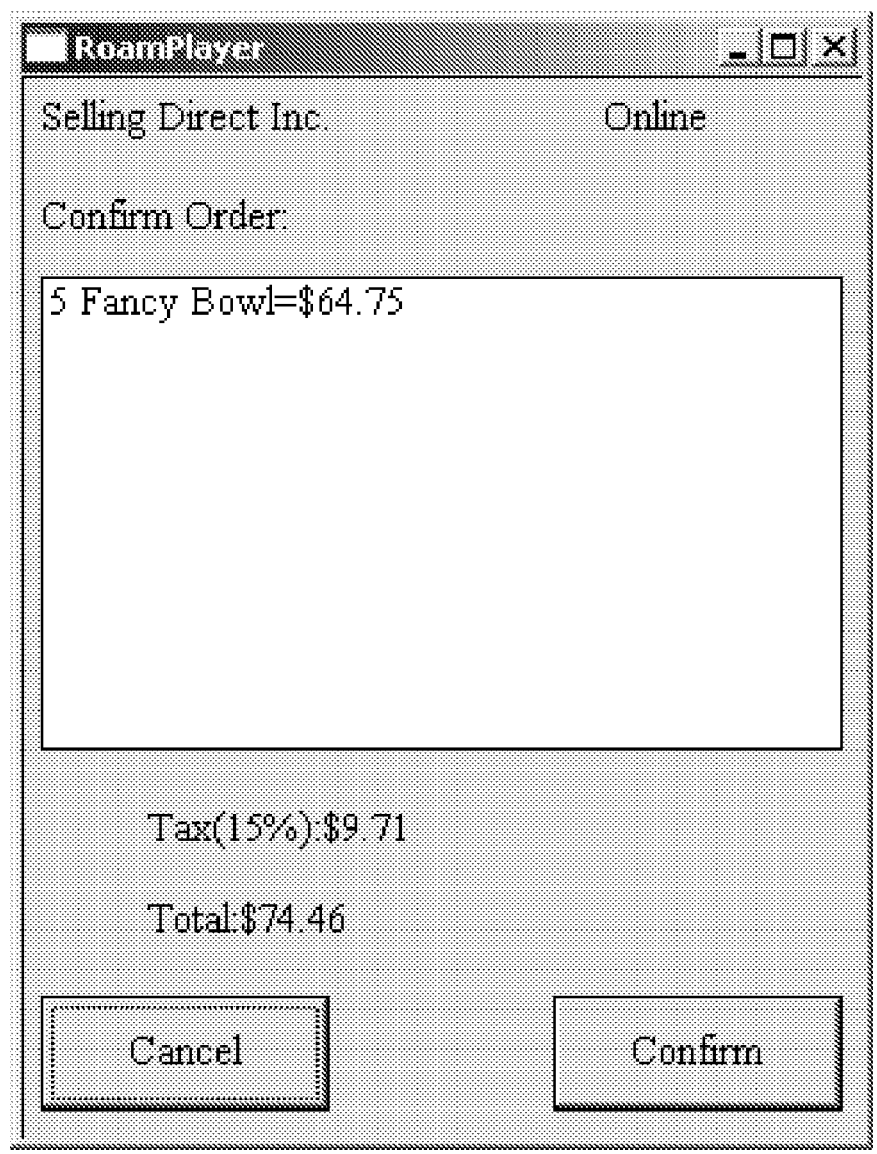
Figure 15:
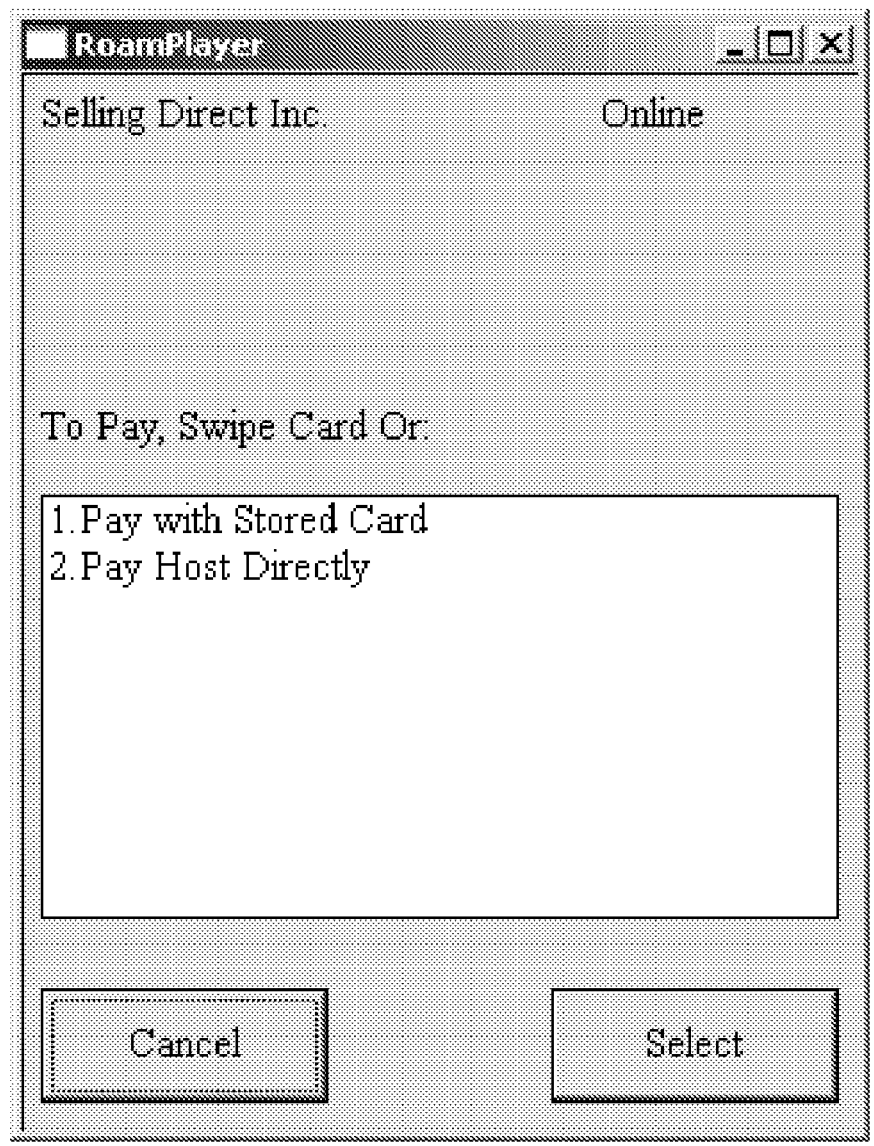
Figure 16:
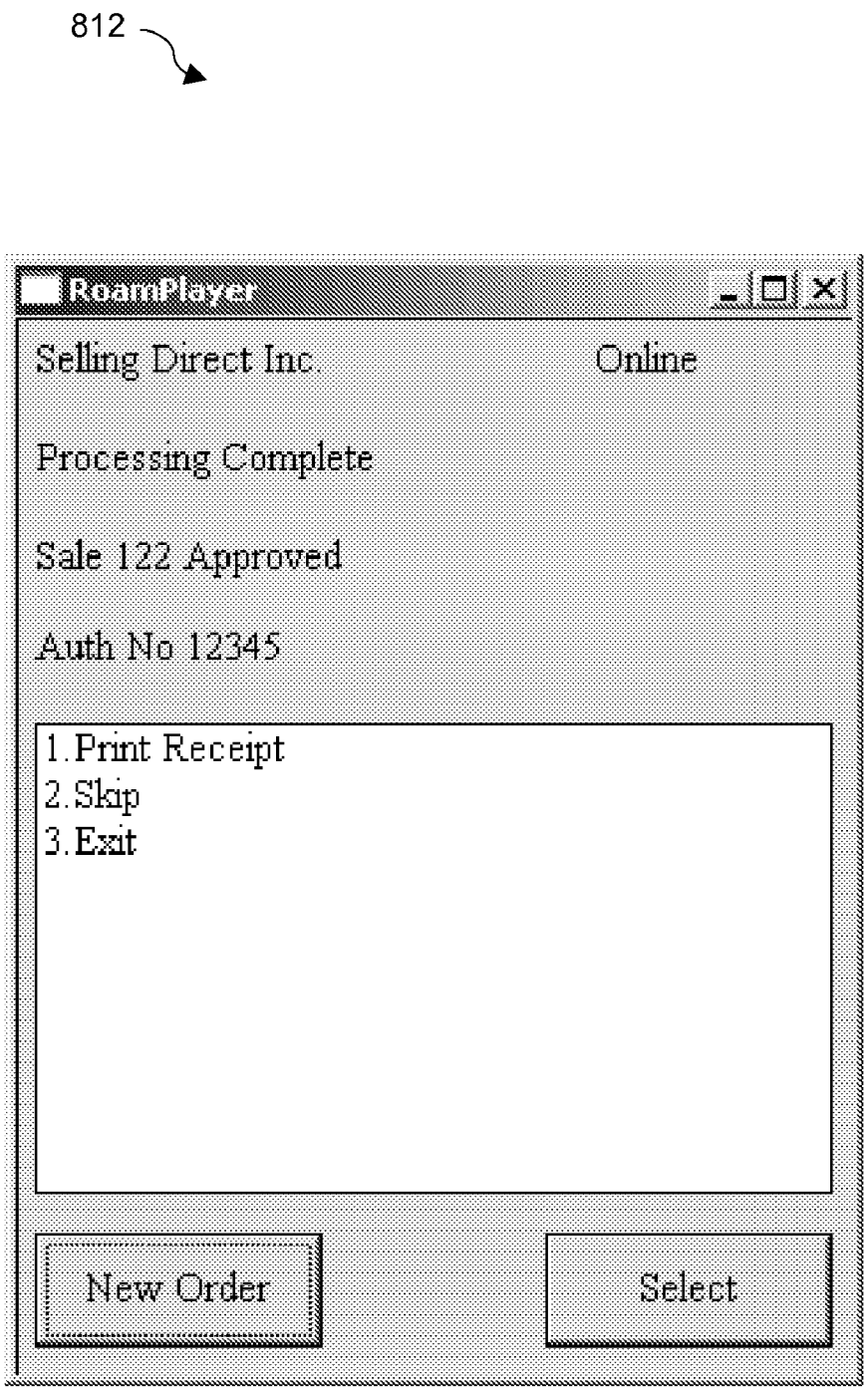

Referring to FIG. 5, at the home page of the application in the consultant's PDA the consultant enters his/her unique consultant ID to login. The application calls a web-service function to verify that this is a valid ID and returns the consultant's name "Deborah Demo Johnson", shown in the screen of FIG. 6. In this screen the main menu is also displayed. It includes the options "1. Start show", "2. Check order status" and "3. Order transactions". In this sample-run, the consultant chooses "1.Start Show" and hits the "Select" button. Next screen displays a list of shows corresponding to the name of the individual at whose residence the show will be staged, shown in FIG. 7. The consultant chooses one and hits "Select." A web-service call is made to get the Address information for the selected Show and this information is displayed along with a menu allowing the consultant to either add a new order to the show or close it out, shown in FIG. 8. In this sample run, the consultant first chooses to place a guest order. Especially on a mobile phone, the process of keying in a customer's name and address can be a laborious one. Here, the "SellingDirect" application employs the use of a third-party web-service which returns a name and address for any ten-digit US listed phone number, as shown in FIG. 9. The same service also allows the user to swipe a credit card to retrieve the same information. The name and address for the customer is displayed, as shown in FIG. 10. If it is correct, the "Continue" button is selected to move on to the order. A menu is displayed showing options for the current order in FIG. 11. In this sample run, the first option, "1. Add item" is chosen and the "Select" button is clicked. The consultant chooses the code for the selected item, enters it in with desired quantity and chooses "O.K." as shown in FIG. 12. The code may be chosen from a hardcopy of the catalogue, which is at hand or from a list stored in the PDA. The application adds this to the existing order and returns to the menu shown in previous step. This may be repeated any number of times with edits, deletes, and additional adds to complete the order for this customer. Then, "Option 4. Done" in the above menu is chosen to move to the order summary. The order is provisionally submitted via a web-service, which returns a summary of which items (if any) are unavailable and which are available, shown in FIG. 13. The order items are displayed. If the order is acceptable, the consultant chooses "Select." The application calls a web-service confirming the order, which returns a summary of all items, the tax, and total for the order, shown in FIG. 14. After confirming, this application gives the option of having the customer pay for the order via credit card swipe or having the consultant pay from his/her own account and having the customer pay them directly, shown in FIG. 15. A third-party web-service is used to process the credit-card transaction and an authorization code is returned. The consultant is given the option of printing a receipt, skipping to the next show, or exiting the application altogether, as shown in FIG. 16.

The server 3000 implements web service orchestration, the combining of multiple web service calls into a single chain. The remote device makes a single call (to the chain) and the server 3000 decomposes the chain into its constituent web service calls, issues the calls, aggregates the results and returns the single result set to the remote device. This is a significant performance advantage over existing AJAX-style solutions as the server 3000 is vastly more powerful than the remote devices connecting to it, and has a much faster and more reliable connection to the destination web services than the remote device. Orchestration also allows the server 3000 to provide transactionality within web service chains. Transactionality is the idea that each web service call in a chain is dependent on the success of all the others, and that a failure in one call should cause us to skip any succeeding calls and to roll back any preceding calls in the chain and for the chain to return failure.

Remote devices in the system can operate in both online (connected) and offline (disconnected) mode and move seamlessly from one mode to the other. This is enabled by storing web service chain calls on the remote device disconnected from the application context in which they occurred. In one example, a user fills out a form to be submitted to a web site. The typical application attaches the values that the user enters to the form the user is filling out. If the remote device goes offline, the application might be able to reload the form with the stored values. The form with the saved values can only be used at other points in the application where that particular visual representation of the data makes sense. Typically, that never happens. The application player, on the other hand, stores the "action" the user tried to perform when he hit the submit button on the form. This allows the application player to accumulate actions that the user wants to perform when/if the remote device restores its connection, and to execute those actions within a different application context (visual representation) than the one in which the action was first formulated. It is a fundamental philosophical and architectural difference between the present system and other solutions that keep an offline store of web service chain calls rather than pictures of forms to enable offline functionality.

The overall system includes developer workstations running a proprietary IDE, connected to a test server, which in turn is connected to a production server. Developers build applications and publish them to the test server. This publishing function distinguishes the system from other systems. Those applications are tested and pass quality assurance on the test server, then promoted to the production server by a user with the appropriate administrator access. Typically, the business workflow of getting an application from development through test, quality assurance and into production is implemented via a disconnected series of scripts, each run manually by some individual developer/manager in the process. The server encapsulates all the business process workflow of developing, testing and deploying an application into a single integrated solution allowing administrators to monitor and control that process through a graphical interface. The present system provides for the chaining of multiple special-purpose test servers in the deployment process, a key differentiator for enterprises which implement multi-tiered test and quality assurance processes.

Among the advantages of this invention may be one or more of the following. The system architecture allows non-programmers to develop applications easily, provides industry- or field-specialists more complete control over the application, which is therefore more likely to serve their needs. There is a central point of control, i.e., the server intermediary. Many remote devices connect to the server intermediary and the server intermediary connects to many other servers and web-services. The system reduces the complexity of the security problem for customers from many devices to many servers by channeling them through the secure server intermediary. The system includes web-service orchestration and web service chaining. The web service chaining provides a faster performance. Authentication, access control, auditing, billing and device management, and provisioning are all handled through a single interface, i.e., the server intermediary. More importantly from a security standpoint the technology reduces the security issues confronted by a single Web service provider from a many to one relationship (i.e. many devices of uncertain provenance accessing a single web service) to a one-to-one relationship (i.e. a single server of guaranteed provenance accessing a single Web service). The size of the application player 1110 is at least six times smaller than a typical browser application, such as Internet Explorer and the size of a web service call generated by the application player 1110 is at least twenty times smaller than a typical web service call on web interfaces such as StrikeIron.

Several embodiments of the present invention have been described. Nevertheless, it will be understood that various modifications may be made without departing from the spirit and scope of the invention. Accordingly, other embodiments are within the scope of the following claims.

What is claimed is:

1. A system for playing one or more Rich Internet Applications (RIAs) on a remote computing device comprising:
   an application player residing in said remote computing device and configured to be executed by said remote computing device;
   an intermediary server configured to communicate with said remote communication device via a first network connection and to receive message requests from said application player and to send message responses to said application player and to provide access of said RIAs to said remote computing device by accessing an application server via a single, secure and access-controlled second network connection, wherein said RIAs reside in said application server and wherein said access is controlled by an application privilege protocol and secured by an application security protocol; and wherein said application privilege protocol is managed by said intermediary server and comprises a first table configured to associate Global Unique Identifiers (GUIDs) with said RIAs and a second table configured to associate RIAs authorized to be executed by said application player; and
   wherein said application player requests functionality of said RIAs from said intermediary server via said message requests and interprets said message responses received from said intermediary server.

2. The system of claim 1 wherein said RIAs are configured to be displayed in said application player.

3. The system of claim 1 wherein business logic of said RIAs requiring data from a source outside of said remote computing device is configured to be executed in said application server.

4. The system of claim 1 wherein at least one of said RIAs comprises an XML document.

5. The system of claim 1 wherein at least one of said RIAs comprises a rich user interface (UI) configured to be displayed in said remote computing device and to receive input from a user via said UI.

6. The system of claim 1 wherein said application player is configured to access a plurality of web services via said intermediary server and wherein said access is controlled by a web service privilege protocol and secured by a web service security protocol; and wherein said web service privilege protocol is managed by said intermediary server and comprises said first table being configured to associate Global Unique Identifiers (GUIDs) with said plurality of web services and said second table being configured to associate web services authorized to be executed by said application player.

7. The system of claim 6 wherein said security protocols comprise any of secure HTTP (S-HTTP), link encryption or web services security(WS-S).

8. The system of claim 6 wherein said intermediary server further provides a complete audit trail of interactions and communications between said remote computing device and said web services and RIAs.

9. The system of claim 6 wherein said intermediary server provides fine-grained access control to individual web service calls to said web services.

10. The system of claim 1 wherein said intermediary server comprises said first and second tables.

11. The system of claim 1 wherein said application player is configured to be certified by a certifying entity.

12. The system of claim 1 wherein said intermediary server is configured to be certified by a certifying entity.

13. The system of claim 1 wherein said remote computing device comprises a managed code environment and wherein said application player is executed within said managed code environment.

14. The system of claim 13 wherein said managed code environment comprises one of Small Technical Interoperability Platform Virtual Machine (STIP VM), J2ME, .NET, or Flash Lite.

15. The system of claim 1 wherein said remote computing device further comprises a secure payment module.

16. The system of claim 1 wherein said remote computing device further comprises one or more device drivers.

17. The system of claim 1 wherein said remote computing device comprises one of mobile phone, PDA, payment module, portable computer, robot, personal computer, server or a computing circuit.

18. The system of claim 1 wherein said message requests from said application player to said intermediary server comprise Extensible Mark-up Language (XML) messages embedded in Simple Object Access Protocol (SOAP) requests and said message responses from said intermediary server to said application player comprise XML messages embedded in SOAP responses.

19. The system of claim 1 wherein said message requests and message responses comprise one of ActionScript Message Format (AMF) or Secure Mobile Application Platform (SMAP) format.

20. The system of claim 1 wherein said intermediary server comprises a load balancing module for managing request from a plurality of remote computing devices.

21. The system of claim 1 wherein said intermediary server comprises a message cache.

22. The system of claim 1 wherein said intermediary server is configured to communicate with an application database, wherein said application database comprises a list of said available RIAs.

23. A system for playing a Rich Internet Application (RIA) on a remote computing device comprising:
   an application player residing in said remote computing device and configured to be executed by said remote computing device;
   an intermediary server configured to communicate with said remote communication device via a first network connection and to receive message requests from said application player and to send message responses to said application player and to provide access of said RIA to said remote computing device by accessing an application server via a single, secure and access-controlled second network connection, wherein said RIA resides in said application server;
   wherein said application player requests functionality of said RIA from said intermediary server via said message requests and interprets said message responses received from said intermediary server; and
   wherein said remote computing device further comprises an offline application cache and said offline application cache comprises one or more applications previously downloaded by said application player.

24. The system of claim 23 wherein said remote computing device further comprises an offline data cache and said offline data cache comprises one or more stored web service calls saved for each of said applications for execution at a later time.

25. A system for playing a Rich Internet Application (RIA) on a remote computing device comprising:
an application player residing in said remote computing device and configured to be executed by said remote computing device;
an intermediary server configured to communicate with said remote communication device via a first network connection and to receive message requests from said application player and to send message responses to said application player and to provide access of said RIA and web services to said remote computing device by accessing an application server via a single, secure and access-controlled second network connection, wherein said RIA resides in said application server;
wherein said application player requests functionality of said RIA from said intermediary server via said message requests and interprets said message responses received from said intermediary server; and
wherein said remote computing device is configured to combine multiple individual web service calls into a single chain and said intermediary server is configured to decompose said single chain into its constituent individual web service calls and place said individual web service calls.

26. A method for playing one or more Rich Internet Applications (RIAs) on a remote computing device comprising:
installing an application player in said remote computing device, wherein said application player is configured to be executed by said remote computing device;
providing an intermediary server configured to communicate with said remote communication device via a first network connection and to receive message requests from said application player and to send message responses to said application player and to provide access of said RIAs to said remote computing device by accessing an application server via a single, secure and access-controlled second network connection, wherein said RIAs resides in said application server and wherein said access is controlled by an application privilege protocol and secured by an application security protocol, and wherein said privilege protocol is managed by said intermediary server and comprises a first table configured to associate Global Unique Identifiers (GUIDs) with said RIAs and a second table configured to associate RIAs authorized to be executed by said application player; and
executing said application player in said remote computing device;
sending a message request from said application player to said intermediary server, wherein said message requests functionality of said RIAs;
sending a message response from said intermediary server to said application player, wherein said message responses comprises said requested RIAs functionality; and
playing said RIAs in said remote computing device by said application player.

27. The method of claim 26 wherein said RIAs are configured to be displayed in said application player.

28. The method of claim 26 wherein business logic of said RIAs requiring data from a source outside of said remote computing device is configured to be executed in said application server.

29. The method of claim 26 wherein at least one of said RIAs comprises an XML document.

30. The method of claim 26 wherein at least one of said RIA comprises a rich user interface (UI) configured to be displayed in said remote computing device and to receive input from a user via said UI.

31. The method of claim 26 wherein said application player is configured to access a plurality of web services via said intermediary server and wherein said access is controlled by a web service privilege protocol and secured by a web service security protocol; and wherein said web service privilege protocol is managed by said intermediary server and comprises said first table configured to associate Global Unique Identifiers (GUIDs) with said plurality of web services and said second table configured to associate web services authorized to be executed by said application player.

32. The method of claim 31 wherein said security protocols comprise any of secure HTTP (S-HTTP), link encryption, or web services security.

33. The method of claim 26 wherein said intermediary server comprises said first and second tables.

34. The method of claim 26 wherein said application player is configured to be certified by a certifying entity.

35. The method of claim 26 wherein said intermediary server is configured to be certified by a certifying entity.

36. The method of claim 26 wherein said remote computing device comprises a managed code environment and wherein said application player is executed within said managed code environment.

37. The method of claim 36 wherein said managed code environment comprises one of Small Technical Interoperability Platform Virtual Machine (STIP VM), J2ME, .NET, or Flash Lite.

38. The method of claim 26 wherein said remote computing device further comprises a secure payment module.

39. The method of claim 26 wherein said remote computing device further comprises one or more device drivers.

40. The method of claim 26 wherein said remote computing device comprises one of mobile phone, PDA, payment module, portable computer, personal computer, robot, server, or computing circuit.

41. The method of claim 26 wherein said message request from said application player to said intermediary server comprises an XML message embedded in Simple Object Access Protocol (SOAP) request and said message response from said intermediary server to said application player comprises and XML message embedded in SOAP response.

42. The method of claim 26 wherein said message request and message response comprise one of ActionScript Message Format (AMF) or Secure Mobile Application Platform (SMAP) format.

43. The method of claim 26 wherein said intermediary server comprises a load balancing module for managing request from a plurality of remote computing devices.

44. The method of claim 26 wherein said intermediary server comprises a message cache.

45. The method of claim 26 wherein said intermediary server is configured to communicate with an application database, wherein said application database comprises a list of said available RIAs.

46. The method of claim 26 wherein said intermediary server further provides a complete audit trail of interactions and communications between said remote computing device and said web services and RIAs.

47. The method of claim 26 wherein said intermediary server provides fine-grained access control to individual web service calls to said web services.

48. A method for playing a Rich Internet Application (RIA) on a remote computing device comprising:
- installing an application player in said remote computing device, wherein said application player is configured to be executed by said remote computing device;
- providing an intermediary server intermediary server configured to communicate with said remote communication device via a first network connection and to receive message requests from said application player and to send message responses to said application player and to provide access of said RIA to said remote computing device by accessing an application server via a single, secure and access-controlled second network connection, wherein said RIA resides in said application server; and
- executing said application player in said remote computing device;
- sending a message request from said application player to said intermediary server, wherein said message requests functionality of said RIA;
- sending a message response from said intermediary server to said application player, wherein said message responses comprises said requested RIA functionality; and
- playing said RIA in said remote computing device by said application player; and wherein said remote computing device further comprises an offline application cache and said offline application cache comprises one or more applications previously downloaded by said application player.

49. The method of claim 48 wherein said remote computing device further comprises an offline data cache and said offline data cache comprises one or more stored web service calls saved for each of said applications for execution at a later time.

50. A method for playing a Rich Internet Application (RIA) on a remote computing device comprising:
- installing an application player in said remote computing device, wherein said application player is configured to be executed by said remote computing device;
- providing an intermediary server intermediary server configured to communicate with said remote communication device via a first network connection and to receive message requests from said application player and to send message responses to said application player and to provide access of said RIA to said remote computing device by accessing an application server via a single, secure and access-controlled second network connection, wherein said RIA resides in said application server; and
- executing said application player in said remote computing device;
- sending a message request from said application player to said intermediary server, wherein said message requests functionality of said RIA;
- sending a message response from said intermediary server to said application player, wherein said message responses comprises said requested RIA functionality; and
- playing said RIA in said remote computing device by said application player; and
- wherein said remote computing device is configured to combine multiple individual web service calls into a single chain and said intermediary server is configured to decompose said single chain into its constituent individual web service calls and place said individual web service calls.

51. A system for playing a Rich Internet Application (RIA) on a remote computing device comprising:
- an application player residing in said remote computing device and configured to be executed by said remote computing device;
- an intermediary server configured to communicate with said remote communication device via a first network connection and to receive message requests from said application player and to send message responses to said application player and to provide access of said RIA to said remote computing device by accessing an application server via a single, secure and access-controlled second network connection, wherein said RIA resides in said application server;
- wherein said application player requests functionality of said RIA from said intermediary server via said message requests and interprets said message responses received from said intermediary server; and
- wherein said intermediary server further provides a complete audit trail of interactions and communications between said remote computing device and said RIA.

* * * * *